Figure 1:
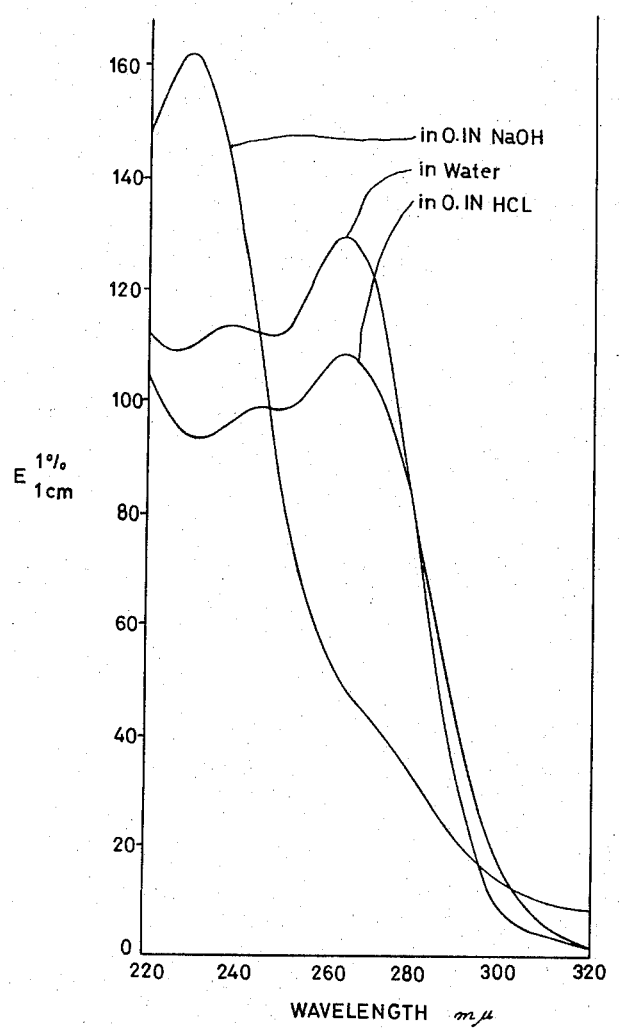

United States Patent [19]
Arai et al.

[11] 3,865,693
[45] Feb. 11, 1975

[54] PROCESS FOR THE PRODUCTION OF ANTIBIOTIC SUBSTANCE CEPHEMIMYCIN

[75] Inventors: Mamoru Arai; Yashuhiro Itoh; Masaki Nakahara; Hisashi Kayamori; Shinichi Sugawara, all of Tokyo, Japan

[73] Assignee: Sankyo Company Limited, Tokyo, Japan

[22] Filed: Aug. 16, 1973

[21] Appl. No.: 389,009

[30] Foreign Application Priority Data
Aug. 31, 1972 Japan.............................. 47-87339

[52] U.S. Cl............................................... 195/80 R
[51] Int. Cl............................................... C12d 9/00
[58] Field of Search ................................. 195/80 R

[56] References Cited
UNITED STATES PATENTS
3,801,464  4/1974  Gorman et al.................... 195/80 R Primary Examiner—Lionel M. Shapiro
Assistant Examiner—Robert J. Warden
Attorney, Agent, or Firm—Flynn & Frishauf

[57] ABSTRACT

Process for the production of a known antibiotic substance, cephemimycin, by cultivation of a newly discovered microorganism *Streptomyces jumonjinensis* strain No. 3008 according to any method employed for *Streptomyces*. The antibiotic substance is effective against gram-negative bacteria.

5 Claims, 2 Drawing Figures

PROCESS FOR THE PRODUCTION OF ANTIBIOTIC SUBSTANCE CEPHEMIMYCIN

This invention relates to a new process for the production of an antibiotic substance, cephemimycin.

More particularly, this invention is concerned with a new process for producing the above antibiotic substance by cultivation of a newly discovered microorganism.

We have found that the antibiotic substance, cephemimycin, is produced in a cultured broth of *Streptomyces jumonjinensis* strain No. 3008 which was isolated from a soil sample collected at Jumonjitoge, Chichibu, Saitama Prefecture, Japan. This antibiotic is isolated from the cultured broth, purified and characterized that it is highly effective against gram-negative bacteria, particularly streptomycin-resistant, kanamycin-resistant and multi-resistnat Escherichia, multi-resistant Klebsiella and multi-resistant Proteus.

The antibiotic substance, cephemimycin, which is produced by the process of this invention has been found to have the following chemical structure and identified to be the same substance as that named "Antibiotic Substance A-16886I" in Dutch Pat. No. 7011805 and also that named "Antibiotic Substance 842A" in the publicly opened specification No. 3286/1971 of Japanese Patent Application.

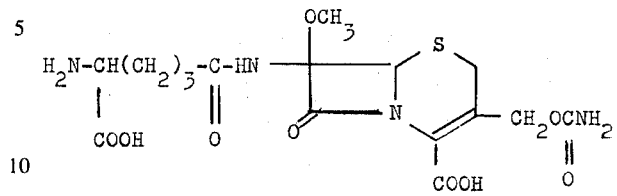

Morphological characteristics of the above cephemimycin-producing strain No. 3008 are as follows: 1. When observed under a microscope, aerial mycelium is well-branched and forms tightly closed spirals, but no conidia chains are observed. Spores are cylindrical in shape and $0.6 - 0.8 \times 1.0 - 1.2$ $\mu$ in size. Spore surface is smooth. Spore chains are in 10 – 50 spores per spore chain. No flagellate spore and sporandium are formed and sporophores are on aerial mycelium.

2. Results obtained in the culture on various culture media (observation made after a 2-week cultivation at 28°C unless otherwise stated) are as shown in Table 1.

Table 1

| Medium | Growth | Aerial mycelium | Substrate mycelium | Reverse | Soluble pigment |
|---|---|---|---|---|---|
| Sucrose-nitrate agar | Moderate | Poor, white | Poor, colorless | While | None |
| Glucose-asparagine agar | Good | Moderate brownish grey | Poor, yellowish grey | Light brownish grey | do. |
| Glycerol-asparagine agar | Moderate | Poor, white | Abundant, yellowish grey | Pale yellowish brown | do. |
| Inorganic salts-starch agar | Good | Poor, greyish white | Moderate yellowish grey | Pale yellow | do. |
| Tyrosine agar | Moderate | None | Moderate colorless | Pale yellow | do. |
| Nutrient agar medium | Good | Poor, white | Moderate yellowish grey | Pale yellow | do. |
| Yeast extract-malt extract agar | Abundant | Abundant, white to brownish grey | Abundant, yellowish grey | Dull yellow | Pale yellowish brown |
| Oatmeal agar | Moderate | None | Moderate colorless | Colorless | None |

3. Physiological properties of the strain No. 3008 are shown in Table 2.

Table 2

| | |
|---|---|
| Temperature range for growth: | 18 – 37°C. |
| Gelatin liquefaction (18°C.): | – , no growth |
| Starch hydrolysis: | -- |
| Milk coagulation: | 25°C., 7 days –<br>37°C., no growth |
| Milk peptonization: | 25°C., 7 days + (pH 6.4)<br>37°C., no growth |
| Melanin formation: | – (in tyrosine-agar medium)<br>– (in peptone-yeast extract iron agar medium) |
| Nitrate reduction: | – |

4. Carbon source utilization pattern of the strain No. 3008 on Pridham-Gottlieb's agar medium is shown in Table 3.

Table 3

| | | | |
|---|---|---|---|
| L-arabinose | + | Lactose | + |
| D-xylose | − | Cellobiose | + |
| D-glucose | + | Trehalose | − |
| D-galactose | + | Raffinose | − |
| D-mannose | + | Inulin | − |
| D-fructose | − | Inositol | + |
| L-rhamnose | + | D-mannitol | − |
| Sucrose | + | | |

From the summary of the above properties, the strain No. 3008 belongs to genus Steptomyces, its mycelium forms tightly close spirals, spores are cylindrical in shape and spore surface is plain. Colorless to yellowish grey growth is observed on various media, white to brownish grey aerial hyphae are formed, soluble pigments are scarecely formed to the extent that some pale yellowish brown soluble pigments are only observed in a yeast extract- malt extract- agar medium. Also, pale yellow to light brownish grey colors are observed on the reverse of the collony. As to physiological properties, no melanin formation, starch hydrolysis and milk coagulation are observed.

Searching the known strains having the above properties, as the most closely related strain may be mentioned *Actinomyces mutabilis* which was described in the International Journal of Systematic Bacteriology, Vol. 18, No. 2, 148 – 150 (1968). However, when compared with the disclosure in the above literature and the strain ISP No. 5169 which is the authentic strain of *Actinomyces mutabilis*, the strain No. 3008 of this invention differs from them in the following points shown in Table 4.

Table 4

| Nature | Strain No. 3008 | Strain ISP No. 5169 |
|---|---|---|
| Shape, surface and number of spores | Cylindrical, smooth, 10 – 50 spores | Cylindrical, smooth, 3 – 10 spores |
| Spirals | Compact spiral filaments | Spiral filaments or hook filaments |
| Color of aerial mycelium | White to brownish grey | White to grey |
| Coremia formation | + | − |
| Sporephore | Spiral | Spiral or hook |
| Carbon utilization | D-xylose, D-fructose, D-mannitol not utilized | D-xylose, D-fructose, D-mannitol utilized |
| Antibiotic production | Cephemimycin | − |

From the above, the strain No. 3008 has been identified as a new species distinctly different from *Actinomyces mutabilis* and named *Streptomyces jumonjinensis* strain No. 3008. The strain No. 3008 has been deposited under an accession No. 1545 with Technical Research Institute of Microbial Industry, Agency of Industrial Science & Technology, Ministry of International Trade and Industry, Japan, and also as NRRL–5741 in the Northern Regional Research Laboratory, Northern Central Region, Agricultural Research Service, United States Department of Agriculture, at Peoria, Ill., U.S.A.

Although we have explained the strain No. 3008 in the foregoing, it is well-known that various properties of Streptomyces are not definite, but may easily be varied naturally and artificially. The strains which may be employed in this invention include all of the strains which belong to the genus Streptomyces and are capable of producing cephemimycin.

From comparison on various properties of the strain No. 3008 with the microorganisms known to produce the same antibiotic substance of cephemimycin, more specifically, *Streptomyces clavuligerus* in Dutch Pat. No. 7011805 and International Journal of Systematic Bacteriology, 21, 4, 326, 1971 as well as *Streptomyces lactamdurans* in the publicly opened specification No. 3286/1971 of Japanese Patent Application, are found the following points.

1. Morphological characteristics (After 14 day culture)

| Characteristics | *Streptomyces jumonjinensis* | Strain *Streptomyces clavuligerus* | *Streptomyces lactamdurans* |
|---|---|---|---|
| Branching of aerial mycelium | Monopodial branching | Sympodial branching (Club-shaped side branches | Straight with few branching |
| Sporophore | Spiral | Straight to flexuous | None |
| Spore chain | 10 – 50 per chain | 1 – 4 per chain | None |
| Fragellate spore | None | None | None |
| Sporangium | None | None | None |
| Spore surface | Smooth (Cylindrical) | Smooth (Oblong to cylindrical) | None |
| Site of sporophore formation | Only on aerial mycelium | Only on aerial mycelium | — |

2. Cultural characteristics on various agar media. (After 14 day culture)

| * | | *Streptomyces jumonjinensis* | *Streptomyces clavuligerus* | *Streptomyces lactamdurans* |
|---|---|---|---|---|
| Sucrose-nitrate agar | G: | Moderate | Scant | Moderate |
| | AM: | Poor, White | | Creamy white |
| | R: | White | | Deep cream |
| | SP: | None | | None |
| Glucose-asparagine agar | G: | Good | Moderate | |
| | AM: | Good; Olive gray | Good; White | |
| | R: | Yellowish gray | Pale yellowish green | — |
| | SP: | None | None | |
| Glycerol-asparagine agar | G: | Moderate | Good | Moderate |
| | AM: | Poor; White | Good; White | Cream |
| | R: | Pale yellow | Pale yellowish green | Golden to orange |
| | SP: | None | None | Pale amber |

—Continued

| * | | Streptomyces jumonjinensis | Streptomyces clavuligerus | Streptomyces lactamdurans |
|---|---|---|---|---|
| Inorganic salts-starch agar | G:<br>AM:<br>R:<br>SP: | Good<br>Poor; Light gray<br>Pale yellowish brown<br>None | Abundant<br>Good; Medium gray<br>Grayish yellow<br>None | Moderate<br>White to green to cinnamon<br>Cream to greenish orange<br>None |
| Nutrient agar | G:<br>AM:<br>R:<br>SP: | Good;<br>Poor; White<br>Pale yellowish brown<br>None | Good;<br>Sparse; White<br>Pale yellowish green<br>None | Moderate<br>Cream<br>Golden<br>None |
| Tyrosine agar | G:<br>AM:<br>R:<br>SP: | Moderate<br>None<br>Pale yellowish brown<br>None | Moderate<br>Poor; Yellowish gray<br>Pale yellow<br>None | Moderate<br>Cream and white<br>Tannin to orange<br>None |
| Yeast extract-malt extract-agar | G:<br>AM:<br>R:<br>SP: | Abundant<br>Abundant; White<br>Dull yellow<br>None | Abundant<br>Abundant; Light grayish olive<br>Grayish yellow<br>None | —<br>—<br>—<br>— |
| Oatmeal** agar | G:<br>AM:<br>R:<br>SP: | Moderate<br>None<br>Colorless<br>None | Moderate<br>Good; White<br>Pale yellow<br>None | Moderate<br>Cream<br>Orange<br>None |

*G: Growth  AM: Aerial Mycelium
R: Reverse  SP: Soluble pigment
**Tomato-paste-oatmeal agar medium for *Streptomyces lactamdurans*

3. Physiological characteristics.

| | Streptomyces jumonjinensis | Streptomyces clavuligerus | Streptomyces lactamdurans |
|---|---|---|---|
| Tyrosinase reaction | − | − | − |
| Nitrate reduction | − | − | − |
| Starch hydrolysis | − | Not described | + |
| Gelatin liquefaction | − | − | + |
| Melanin formation Peptone-yeast extract iron agar | − | − | − |
| Tryptone-yeast broth | | | Not described |
| Milk coagulation: 25°C | − | − (temperature not described) | Not described |
| 37°C | No growth | | |
| Milk peptonization: 25°C | + (pH 6.4) | + (temperature not described) | +(alkaline) |
| 37°C | No growth | (temperature | not described) |

4. Carbon utilization

| | Streptomyces jumonjinensis | Streptomyces clavuligerus | Streptomyces lactamdurans |
|---|---|---|---|
| D-Glucose | + | − | + |
| L-Arabinose | + | − | + |
| Sucrose | + | − | − |
| L-Rhamnose | + | − | − |
| Raffinose | − | − | + |
| D-Xylose | − | − | + |
| i-Inositol | + | (+) | − |
| D-Mannitol | − | − | + |
| D-Fructose | − | − | + |

From the above comparative studies on physiological and morphological properties, it can be clearly concluded that *Streptomyces jumonjinensis* in this invention is distinctly different from *Streptomyces lactamdurans* from the physiological and morphological points of view, and also that the present microorganism is distinctly different from *Streptomyces clavuligerus* in view of different branching of aerial mycelium, which is of significance in classification of actinomycetes, and also of a great difference in carbon utilization between them.

Cultivation in the process of this invention may be carried out according to the method generally employed for *Streptomyces*. Shaken culture or submerged culture in a liquid medium is preferable.

As medium components may be employed any of the well-known nutrient materials for *Streptomyces*. For instance, as an assimilable carbon source, glucose, glycerol, maltose, dextrin, starch, soybean oil, cotton seed oil, etc. and, as an assimilable nitrogen source, soybean meal, peanut meal, cotton seed meal, fish meal, corn steep liquor, peptone, meat extract, yeast, yeast extract, sodium nitrate, ammonium nitrate, ammonium sulfate, etc. may be used. And, sodium chloride, phosphates, calcium carbonate, etc. may be used as an inorganic salt. A minor amount of a metal salt may also be added, if necessary.

In carrying out liquid cultivation with aeration and agitation, an anti-foaming agent, e.g., silicon oil, vegetable oils, surfactants, etc. may be suitably employed.

The pH of the medium may be suitably within or around neutral range and cultivation temperature may be usually of 25° – 30°C., in particular about 27°C. being preferred.

Change with time lapse in the activity of an antibiotic substance cephemimycin, which is being produced in the cultured broth as the cultivation proceeds, can be determined by a well-known cylinder-plate test method using *Proteus vulgaris* as a test microorganism. Usually, the maximum production of cephemimycin may be accomplished by cultivation for 40 – 80 hours. For instance 40 μg./ml. of cephemimycin in a 30 ml. volume jar fermentor was produced in the cultured broth after 40 hours.

Cephemimycin is easily soluble in water and existed predominantly in a liquid portion of the cultured broth.

After completion of the cultivation, mycelium and other solid mass are removed by a filtration procedure using diatomaceous earth and the like as a filter aid or by centrifugal separation and cephemimycin involved in the filtrate or supernatant phase may be isolated and purified by utilizing its physico-chemical properties.

For instance, cephemimycin may be recovered from the cultured broth by the use of an adsorbent. As the adsorbent may be, for example, active charcoal powder and the cephemimycin adsorbed by active charcoal powder may be eluted with methanol-water, n-butanol-water, aqueous acetone and the like. Also, cephemimycin is an amphoteric substance having both strong acidity and weak basicity and thus may be adsorbed and eluted with cation or anion exchange resins.

Examples of the cation exchange resin which may be employed are strongly acidic cation exchange resins, e.g., Dowex 50W × 4 (manufactured by Dow Chemical Co., U.S.A.), Amberlite IR-120 (manufactured by Rohm & Haas Co., U.S.A.) and the like. As examples of the anion exchange resins may be strongly basic anion exchange resins, e.g., Dowex IxI (manufactured by Dow Chemical Co.), etc., but weakly basic anion exchange resins, e.g., Duolite A-2 (manufactured by Diamond-Alkali Co., U.S.A.) may be preferably employed. Further, a chromatography may be effected by the use of silica gel, Avicel (microcrystalline form cellulose, available from Asahi Kasei Kogyo K.K., Japan), etc. Cephemimycin may be purified too a single isolated state on a thin layer chromatography by the repeated use of any combination of such purification means. Physico-chemical properties of cephemimycin are given below.

1. Appearance
   Pale yellowish white powder
2. Melting point
   160°C. (with decomposition)
3. Elementary analysis
   C : 42.60% H : 5.76% N : 11.42% S : 5.52%
4. Specific rotation
   $[\alpha]_D^{20} = +102°$ ($c = 1$, water)
5. Neutrality, basicity or acidity
   pKa' = 2.97, 9.41
6. Ultraviolet absorption spectrum
   As shown in FIG. 1 values of maximum absorption positions and of $E_{1\ cm}^{1\ \%}$ are as shown in Table 5.

Table 5

| Solvent | Absorption Max. (mμ) | $E_{1\ cm}^{1\ \%}$ | Absorption Max. (mμ) | $E_{1\ cm}^{1\ \%}$ |
|---|---|---|---|---|
| H₂O | 238 | 114 | 263 | 130 |
| 0.1N HCl | 244 | 98 | 263 | 108 |
| 0.1N NaOH | 229–230 | 162 | | |

Figure 2:
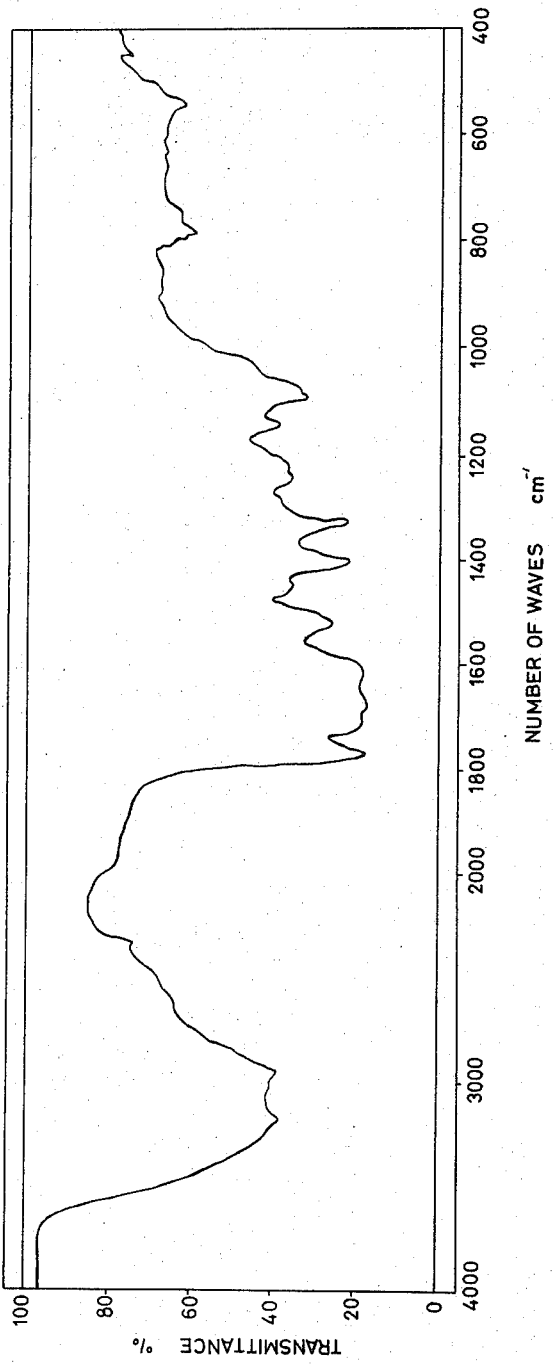

7. Infrared absorption spectruum
   As shown in FIG. 2 (measured with KBr tablets)
8. Solubility
   It is easily soluble in water, soluble in methanol, sparingly soluble in ethanol and insoluble in other organic solvents.
9. Color reaction
   Positive for ninhydrin, Benedict and Tollens reactions.
   Negative for ferric chloride, biuret, orcinol-hydrochloric acid, Anthrone and Elson-Morgan reactions.
10. Stability
    Its aqueous solution is relatively stable at an acidic or slightly alkaline state and 90 %, 100 % and 85 % of its activities remain unchanged at pH 2, 7 and 8, respectively, even after heat treatment at 60°C. for 30 minutes.
11. Thin layer chromatography
    By a thin layer chromatography (ascending method) using Cellulose Chromatogram Sheet 6065 (manufactured by Eastman Kodak Co., U.S.A.), Rf values are as shown in Table 6. Bioautography with *Proteus vulgaris* or coloration with ninhydrin was employed for detection.

Table 6

| Developing solvent | Rf value |
|---|---|
| n-butanol: acetic acid : water (4 : 1 : 2) | 0.33 |
| 40% n-propanol | 0.83 |
| 3 % ammonium chloride : methanol (3 : 7) | 0.50 |
| n-propanol : pyridine : acetic acid : water (15 : 10 : 3 : 10) | 0.29 |
| methyl ethyl ketone : n-butanol : water (30 : 5 : 65) | 0.87 |

12. High voltage paper electrophoresis
    Electrophoresis is effected for 30 minutes under a condition of 3,300 V and 40 mA with a buffer solution of formic acid : acetic acid : water (1 : 3 : 36) having pH 1.8 by the use of Toyo Filter Paper No. 5 with 60 cm × 20 cm (manufactured by Toyo Roshi K.K., Japan) and detection is made in the same manner as in the thin layer chromatography. The mobility of cephemimycin is 0.3, when that of L-alanine is 1.0.

The powdery cephemimycin having the above physico-chemical properties is further purified by a column chromatography to give white powder, which has the same properties as given in the foregoing except for the physical properties shown below.

1. Elementary analysis (as monoammonium salt)
   C : 41.69%, H : 5.86%, N : 14.37%, S : 6.88%
   Calculated: C : 41.46%, H : 5.44%, N : 15.11%, S : 6.92%
2. Specific rotation
   $[\alpha]_D^{20} = +135°$ ($c = 1$, H₂O)

3. Ultraviolet absorption spectrum

| Solvent | Absorption Max. (mμ) | $E_{1\ cm}^{1\ \%}$ |
|---|---|---|
| H₂O | 242 | 132 |
|  | 263 | 157 |
|  | 245 | 117 |
| 0.1N HCl | 263 | 133 |

Biological activities of cephemimycin are set forth below

1. Antimicrobial spectrum

Minimal inhibitory concentrations of various microorganisms are as shown in Table 7.

Table 7

| Test organism | Medium* | MIC μg./ml. |
|---|---|---|
| Staphylococcus aureus 209P JC-2 | H | > 200 |
| S. aureus 56 | do. | 200 |
| S. aureus 193 | do. | 200 |
| S. aureus 52-34 | do. | > 200 |
| Bacillus subtilis PCI 219 | do. | 12.5 |
| Sarcina lutea PCI 1001 | do. | 25 |
| Corynebacterium xerosis B58-3 | do. | 25 |
| Mycobacterium smegmatis ATCC 607 | G | > 200 |
| Escherichia coli NIHJ JC-2 | do. | 12.5 |
| E. coli (SM resistant) | G | 3.12 |
| E. coli (KM resistant) | do. | 0.78 |
| E. coli GN2645 (Multi-resistant) | do. | 12.5 |
| Klebsiella pneumoniae PCI 602 | do. | 3.12 |
| K. penumoniae GN2984 (Multi-resistant) | do. | 6.25 |
| Proteus vulgaris OX 19 | do. | 3.12 |
| P. rettgeri GN2825 (Multi-resistant) | do. | 50 |
| P. mirabilis IFO 3849 | do. | 3.12 |
| P. mirabilis GN829 (Multi-resistant) | do. | 3.12 |
| P. mirabilis GN1973 | do. | 12.5 |
| P. mirabilis GN1973 R$_{GN}$2984 (Multi-Resistant) | do. | 3.12 |
| Pseudomonas aeruginosa B 1-1 | do. | 12.5 |
| P. aeruginosa SC-8753 | do. | > 200 |
| P. Sp. SC-8328 | do. | > 200 |
| Candida albicans YU 1200 | S | > 200 |
| C. tropicalis WH 42 | do. | > 200 |
| Saccharomyces cerevisiae ATCC 9763 | do | > 200 |
| Cryptococcus neoformans WH 15-4 | do. | > 200 |
| Trichophyton mentagrophytes F 63-9 | do. | > 200 |
| Epidermophyton fluoccosum ATCC 10227 | do. | > 200 |
| Penicillium chrysogenum Q 176 | P | > 200 |
| Aspergillus oryzae IAM 2630 | do. | > 200 |
| Fusarium moniliforme IAM 5062 | do. | > 200 |
| Botrytis cinerea IAM 5126 | do. | > 200 |
| Piricularia oryzae IAM 5087 | do. | > 200 |
| Pellicularia sasakii P-35 | do. | > 200 |

*Medium
H: Heart infusion agar
G: Heart infusion agar with 1% glycerol
S: Sabouraud-dextrose agar
P: Potato-dextrose agar Cultivation: MIC was determined by that obtained after the cultivations for 24 hours at 37°C. for bacteria and for 48 hours at 28°C. for yeasts and fungi. As a result of the MIC on bacteria in Heart Infusion medium with 10 % horse serum, no effect has been found upon the addition of horse serum.

As is apparent from the Table 7, cephemimycin has a high antibacterial activity against gram-negative bacteria.

2. Toxicity

No abnormal phenomena have been observed after 14 days from administration of 800 mg./kg. to mouse by intravenous injection.

3. Protective activity

Cephemimycin has been observed to show an effectiveness in a protection test on mouse by Escherichia coli. More specifically, ddY-strain mice of each average body weight of about 20 g., each group consisting of 10 animals, were inoculated with 1 × 10⁷ cells per mouse of Escherichia coli 640, a multi-resistant strain, and cephemimycin was subcutaneously administered in its sterile sodium chloride solution at 6.25 – 50 mg./kg. two times, namely, immediately after the inoculation and after 4 hours from the inoculation. The numbers of surviving mice are as shown in Table 8.

Table 8

| Dose (mg./kg.) | Day after administration | | | | | |
|---|---|---|---|---|---|---|
|  | 0 | 1 | 2 | 3 | 5 | 7 |
| 0 (Control) | 10 | 4 | 0 | 0 | 0 | 0 |
| 6.25 | 10 | 7 | 6 | 6 | 6 | 10 |
| 12.5 | 10 | 10 | 9 | 9 | 9 | 9 |
| 25 | 10 | 10 | 10 | 10 | 10 | 10 |
| 50 | 10 | 10 | 10 | 10 | 10 | 10 |

As is apparent from the Table 8, cephemimycin can exhibit its protective effect even at a dose of 6.25 mg./kg.

From the results of our studies on known antibiotic substances having the above-described physicochemical and biological properties, it has been confirmed that the cephemimycin obtainable by the present process is identical with the above-mentioned antibiotic substances A-16886I and 842A.

The process of this invention is more illustratively explained by the following examples, but the production according to this invention may be practised in various manners based upon the properties of cephemimycin as disclosed herein. Then, this invention is not limited to these examples but includes all of the methods for production, extraction and purification of cephemimycin by well-known means upon the thus proved properties of cephemimycin through this invention.

EXAMPLE 1.

The strain No. 3008, which had been cultivated on a malt extract-yeast extract agar medium, was inoculated to 100 ml. (in a 500 ml.-volume Sakaguchi flask) of a medium (of pH 7.2 before sterilization) containing 2.0 % glucose, 1.0 % starch, 0.9 % yeast, 0.5 % Polypepton, 0.5 % meat extract, 0.3 % calcium carbonate, 0.5 % sodium chloride and 0.02 % Disfoam CB442 (available from Nippon Oils & Fats Co., Ltd., Japan) as an antifoamer and a shaking culture was effected at 27°C. for 2 days to make a seed culture. 200 ml. of this seed culture was placed into a 30 l.-volume jar-fermentor containing 15 l. of the culture medium of the same composition as set forth above and cultivation was effected for 40 hours at a rotation of 200 rpm, an aeration of 15 l./min., an inner pressure of 1.1 $kg/cm^2$ and a temperature of 27 ± 1°C. to produce 40 $\mu$g./ml. of cephemimycin.

14 l. of the cultured broth was filtered by the use of diatomaceous earth (Celite 545; trade name) as a filter aid and combined with aqueous washings to form 12 l. of the filtrate. 300 g. of active charcoal powder was added to the so obtained culture filtrate and stirring was done, whereupon cephemimycin was adsorbed thereon. Filtration was again effected by the use of diatomaceous earth and washing was made with water. For the elution of cephemimycin from the active charcoal powder, 80 % acetone was used in two portions of 7.5 l., the active charcoal powder was removed by filtration and then the eluate was concentrated under reduced pressure to give 250 ml. of a concentrate (41.3 % of a yield on activity). The concentrate was passed through a column packed with 400 ml. of Duolite A–2 (Cl-type) to adsorb cephemimycin therein, the column was washed with 650 ml. of water and eluted with 0.1 N hydrochloric acid. 650 ml. of the active eluate (yield 34.3 %) was neutralized with 0.1 N aqueous ammonia, 13 g. of active charcoal powder was added thereto for de-salting, thereby making cephemimycin adsorbed, and then elution was made twice with 350 ml. of 80 % aqueous acetone (yield 17.2 %). The eluate was concentrated to 20 ml. under reduced pressure and freeze-dried to give 950 mg. of crude powder (activity of 86.2 mcgu./mg.). The crude powder was dissolved in a small amount of 80 % aqueous methanol and adsorbed on a column prepared with 300 g. of silica gel, Mallinckrodt CC–4 (manufactured by Mallinckrodt Chemical Works) in chloroform: methanol: water (9 : 9 : 2). Elution was effected with the solvent system of the same composition as shown above. 180 ml. of active eluate was collected, concentrated to dryness under reduced pressure, dissolved in 50 ml. of water, extracted twice with ethyl acetate in equal portions to remove contaminates and then freeze-dried to give 81 mg. of cephemimycin (activity of 250 mcgu./mg.) as crude powders (Yield 4.2 %).

EXAMPLE 2

2 l. of cephemimycin-containing eluate obtained from Duolite A–2 by the same procedure as given in Example 1 (a yield on activity of 31.2 %) was neutralized with 1 N aqueous ammonia, adsorbed on a column of 46 g. of active charcoal for chromatography (manufactured by Wako Junyaku K.K., Japan) packed with water, washed with 500 ml. of water and then eluted with 8 % aqueous acetone. 1 l. of the active eluate (yield 22.6 %) was passed through a column of 300 ml. of Dowex 50W × 4 (equilibrated with 0.01 M sodium citrate of pH 3) to adsorb cephemimycin therein, which was washed with 600 ml. of the same buffer solution and then eluted with 0.03 M sodium citrate of pH 3. 500 ml of the active eluate (yield 18.7 %) was collected and desalted by conducting again a chromatography with active charcoal under the same condition as mentioned above. 80 ml. of the eluate from 8 % aqueous acetone was concentrated to 20 ml. under reduced pressure and freeze-dried to give 79 mg. of cephemimycin as pale yellowish white crude powders (activity of 527 mcgu./mg.) (yield 9.4 %).

EXAMPLE 3

In a 600 l-volume fermentation tank was prepared 300 l. of a liquid culture medium having the same composition as shown in Example 1. After sterilization, 50 l. of a seed culture, which had previously been cultivated in a medium having the same composition for 24 hours, was inoculated and cultivation was effected at 27°C for 45.5 hours (aeration of 300 l./min., rotation of 190 rpm, inner pressure of 1 kg./$cm^2$). 350 l. of the culture broth obtained by the above cultivation was filtered through a filter press by the use of diatomaceous earth as a filter aid to give 310 l. of culture filtrate. To the so obtained culture filtrate were added 6.2 kg. of active carbon powder and 6 kg. of diatomaceous earth and, after stirring, filtration was made to collect active charcoal powder. The charcoal cake was washed with water and extracted twice with 100 l. of 80 % aqueous acetone. 190 l. of the extract was concentrated under reduced pressure to give 42 l. of a concentrate (yield on activity of 47.0 %). The concentrate was adjusted to pH 8 and passed through a column of 25 l. of Duolite A–2 (acetate-form). By this procedure, 80 % of active component was passed therethrough (yield 37.6 %). The effluent was combined with the aqueous washing to amount to 92 l. to which 1.84 kg. of active charcoal powder was added. After stirring, the cephemimycin adsorbed was extracted twice with 45 l. of 8 % aqueous acetone to give 70 l. of extract, which was then concentrated to 3 l. under reduced pressure (yield 23.0 %). The concentrate was diluted to 6.1 with water, adjusted to pH 4.15 with acetic acid and passed through a column of 3 l. of Duolite A–2 (acetate-form).

After washing with 15 l. of acetic acid of pH 3.0, cephemimycin was eluted with a 0.2 N pyridineacetic acid buffer solution of pH 5.5. The active eluate (18 l.) concentrated to 900 ml. under reduced pressure (pH 3.0, yield 20.7 %). From the concentrate, cephemimycin was again adsorbed on a column of 1.65 l. of Duolite A–2 (acetate-form), the column of which was then washed with 7.5 l. of acetic acid of pH 3.0 and eluted with the above-mentioned pyridine acetic acid buffer solution. 3 l. of the active eluate was concentrated to dryness under reduced pressure (yield 20.0 %). The crude powder was washed twice with 300 ml. of ethanol and dissolved in 300 ml. of water (yield 18.4 %). 660 mg. of active charcoal powser was added thereto, followed by stirring and filtering (yield 17.3 %). The filtrate was concentrated to 30 ml. The con-

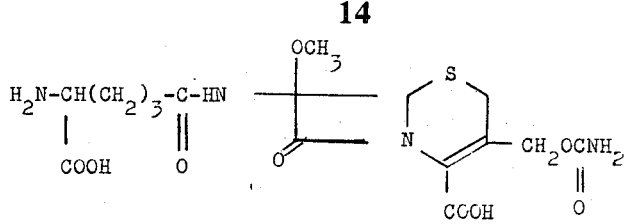

centrate was passed through a column of 900 ml. of Amberlite CG–50 (H-form) to remove a trace of remaining pyridine through adsorption, the column of which was washed with water and the effluent was concentrated followed by freeze-drying to give 3.94 g. of cephemimycin in a pure state (1,000 mcqu./mg.) with pale yellowish white color (yield 12.7 %).

What is claimed is:

1. A process for producing an antibiotic substance cephemimycin which comprises cultivating *Streptomyces jumonjinensis* strain No. 3008 (NRRL 5741) in a nutrient medium and recovering the antibiotic substance from the cultured broth.

2. The process according to claim 1 wherein said cultivation is effected under aerobic condition.

3. The process according to claim 1 wherein said cultivation is effected at a temperature ranging within 25°C. to 30°C.

4. The process according to claim 1 wherein said cultivation is effected for 40 – 80 hours.

5. The process according to claim 1 wherein said medium has a pH value of about 7.

* * * * *

PAGE ONE

UNITED STATES PATENT AND TRADEMARK OFFICE
CERTIFICATE OF CORRECTION

PATENT NO. : 3,865,693
DATED : February 11, 1975
INVENTOR(S) : MAMORU ARAI et al It is certified that error appears in the above-identified patent and that said Letters Patent are hereby corrected as shown below:

Column 1, line 20: after "multi-", replace "resistnat" with -- resistant --.

Columns 1-2, Table 1: under "Reverse", "While" should be -- White --.

Columns 5-6, "Physiological characteristics" Table: next to "Milk peptonization", the last two columns should read as follows:

-- + (temperature not described)    + (alkaline)

(temperature not described)    (temperature not described) --.

Column 7, last line: replace "$E_1\%^{1\ cm.}$" with -- $E_1^{1\%}$ cm. --.

Column 8, Table 5, and Column 9, first table: in headings, replace "$E_1 \ _{1\ cm.}^{1\%}$" with -- $E_1^{1\ \%}\ _{cm.}$ --.

Column 8, line 10: replace "spectruum" with -- spectrum --.

Column 9, line 9: "0.1 N HCl" should be printed opposite "245" and "117". (one line above its present position)

Column 9, Table 7: replace "fluoccosum" with -- floccosum --.

PAGE TWO

UNITED STATES PATENT AND TRADEMARK OFFICE
CERTIFICATE OF CORRECTION

PATENT NO. : 3,865,693
DATED : February 11, 1975
INVENTOR(S) : MAMORU ARAI et al It is certified that error appears in the above-identified patent and that said Letters Patent are hereby corrected as shown below:

Column 10, Table 8, second line: under "(Control)", delete "10";
        in the same line, the remaining numbers should read: -- 10 7 6 6 6 6 --.

Column 12, line 48: replace "6.1" with -- 6 1. --.

Column 12, line 66: replace "powser" with -- powder --.

Signed and Sealed this twenty-fifth Day of November 1975

[SEAL]

Attest:

RUTH C. MASON
Attesting Officer

C. MARSHALL DANN
Commissioner of Patents and Trademarks